(12) United States Patent
Rao

(10) Patent No.: US 11,308,792 B2
(45) Date of Patent: Apr. 19, 2022

(54) SECURITY SYSTEMS INTEGRATION

(71) Applicant: Honeywell International Inc., Morris Plains, NJ (US)

(72) Inventor: Manjuprakash Rama Rao, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 16/887,250

(22) Filed: May 29, 2020

(65) Prior Publication Data
US 2020/0294390 A1 Sep. 17, 2020

Related U.S. Application Data

(63) Continuation of application No. 16/289,507, filed on Feb. 28, 2019, now Pat. No. 10,692,364.

(51) Int. Cl.
*G08B 13/00* (2006.01)
*G08B 31/00* (2006.01)
(Continued)

(52) U.S. Cl.
CPC ......... *G08B 31/00* (2013.01); *G06K 9/00718* (2013.01); *G06K 9/629* (2013.01);
(Continued)

(58) Field of Classification Search
CPC .. G01C 21/165; G01C 21/206; G01C 21/265; G01C 21/36; G01C 21/3602; A61B 5/02438; G01S 19/10; G01S 19/18; G01S 19/47; G01S 1/042; G01S 1/24; G01S 5/0263; G01S 5/10; G06F 1/1615;
(Continued)

(56) References Cited

U.S. PATENT DOCUMENTS 4,962,473 A 10/1990 Crain
5,654,749 A 8/1997 Kanno
(Continued)

OTHER PUBLICATIONS

"Security-Integration of access, intrusion, and video systems and data," 4 pages, date accessed: May 28, 2019.
(Continued)

*Primary Examiner* — Daniel Previl
(74) *Attorney, Agent, or Firm* — Seager, Tufte & Wickhem LLP

(57) ABSTRACT

A security system having a seamless integration wearable, portable, personal or body cameras for observant personnel, a locator sensor associated with each camera, a graphical user interface (GUI) module having a display, and a processor connected to the cameras and the locator sensor associated with each camera, and connected to the GUI module. Video from the cameras may be fed to the GUI. The video may be annotated by the processor with locations from locator sensors associated with the cameras. The display may provide a visualization of the location of each camera. The processor may incorporate an artificial intelligence module to process the video and locations, and based on results of processing the video and locations, can detect and model threats from the video and locations. An assessment of the threats, based on models of the threats, may result in alerts.

16 Claims, 7 Drawing Sheets

(51) Int. Cl.
*G06K 9/66* (2006.01)
*G06K 9/62* (2022.01)
*G06K 9/00* (2022.01)
*G08B 27/00* (2006.01)

(52) U.S. Cl.
CPC .............. *G06K 9/66* (2013.01); *G08B 27/00* (2013.01); *G06K 2009/00738* (2013.01); *G06K 2209/21* (2013.01)

(58) Field of Classification Search
CPC ...... G06F 1/163; G06F 1/1635; G06F 1/1683; G06K 2009/00738; G06K 2209/21; G06K 9/00718; G06K 9/00771; G06K 9/629; G06K 9/66; G07C 9/00; G08B 13/19613; G08B 13/19621; G08B 13/19671; G08B 13/19682; G08B 27/00; G08B 29/186; G08B 29/188; G08B 31/00; G08B 7/066; H01R 24/60; H04M 1/0254; H04M 1/05; H04N 5/225
USPC ....... 340/541, 531, 5.2, 430, 539.19, 539.11, 340/539.14–539.16, 506–508
See application file for complete search history.

(56) References Cited

U.S. PATENT DOCUMENTS

| | | | |
|---|---|---|---|
| 5,706,362 A | 1/1998 | Yabe | |
| 5,789,913 A | 8/1998 | Mager | |
| 5,850,527 A | 12/1998 | Suzuki | |
| 5,887,109 A | 3/1999 | Tsuji et al. | |
| 5,959,692 A | 9/1999 | Nakaya et al. | |
| 6,504,479 B1* | 1/2003 | Lemons | G08B 13/19645 340/541 |
| 6,999,562 B2* | 2/2006 | Winick | G08B 25/008 340/531 |
| 7,627,665 B2 | 12/2009 | Barker et al. | |
| 9,588,215 B1* | 3/2017 | Lowry | G01S 3/7865 |
| 9,677,327 B1 | 6/2017 | Nagel et al. | |
| 10,692,364 B1* | 6/2020 | Rao | G08B 31/00 |
| 2003/0023874 A1* | 1/2003 | Prokupets | G07C 9/20 726/4 |
| 2004/0239761 A1 | 12/2004 | Jin et al. | |
| 2006/0035635 A1* | 2/2006 | Kumagai | H04M 1/72541 455/426.2 |
| 2009/0115570 A1* | 5/2009 | Cusack, Jr. | H04N 7/18 340/5.2 |
| 2016/0335865 A1* | 11/2016 | Sayavong | G06F 16/951 |
| 2018/0146645 A1 | 5/2018 | Arbel | |
| 2018/0268238 A1 | 9/2018 | Khan et al. | |
| 2019/0261145 A1* | 8/2019 | South | H04W 4/021 |
| 2019/0326015 A1* | 10/2019 | Cannell | G16H 40/67 |
| 2020/0162785 A1* | 5/2020 | Gentile | G06F 13/22 |
| 2020/0242909 A1* | 7/2020 | Keiser | G08B 21/18 |

OTHER PUBLICATIONS

Kumbhar, "An Overview on Use of Arlificial Intelligence Techniques in Effective Security Management," International Journal of Innovative Research in Computer and Communication Engineering, vol. (2): 5893-5898, Sep. 2014.

* cited by examiner

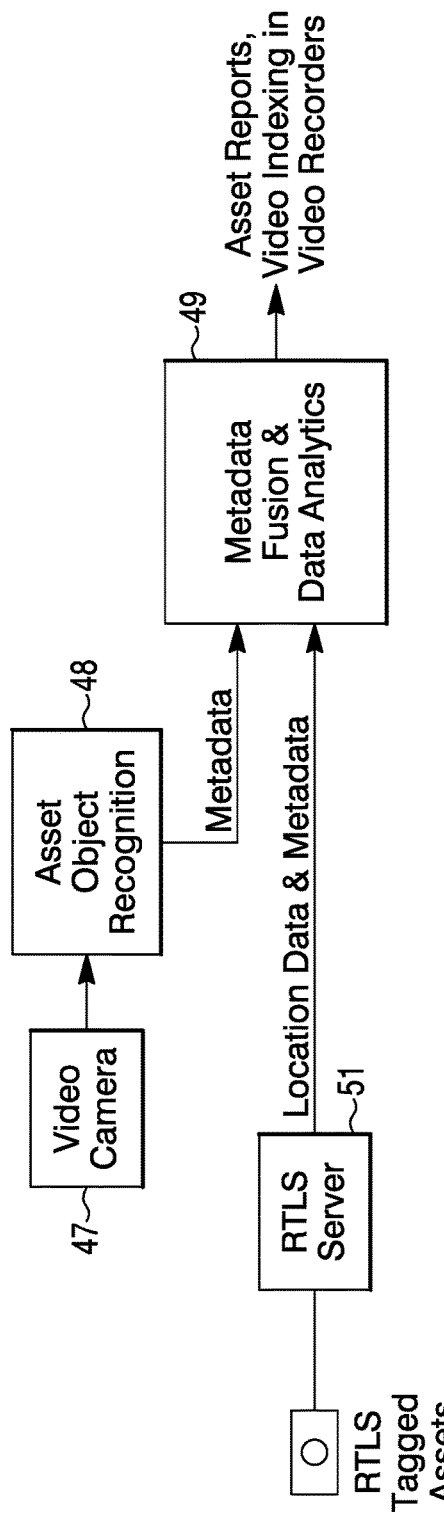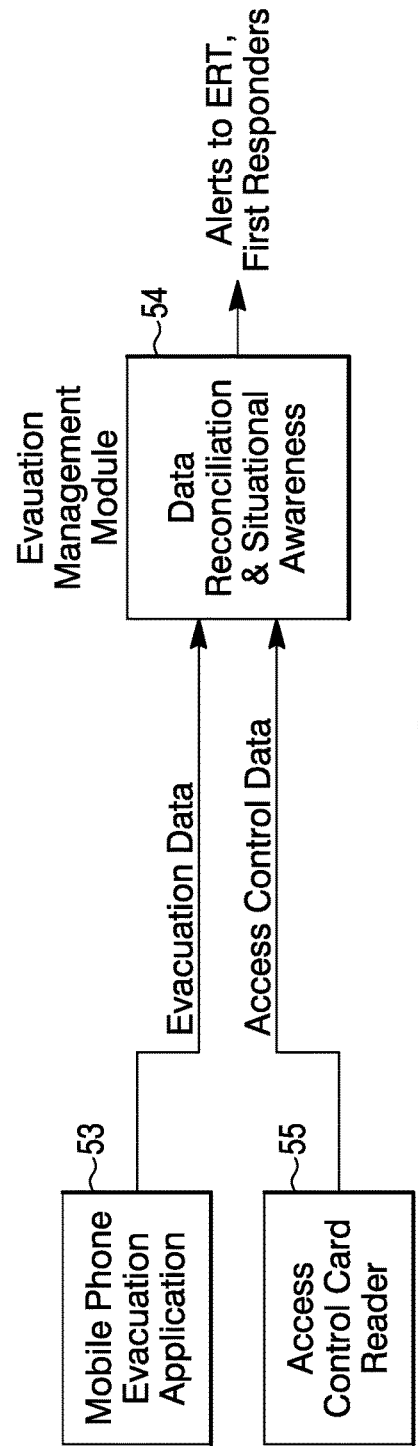

SECURITY SYSTEMS INTEGRATION

This application is a continuation of U.S. patent application Ser. No. 16/289,507, filed Feb. 28, 2019. U.S. patent application Ser. No. 16/289,507, filed Feb. 28, 2019, is hereby incorporated by reference.

BACKGROUND

The present disclosure pertains to security surveillance equipment and techniques.

SUMMARY

The disclosure reveals a security system having a seamless integration wearable, portable, personal or body cameras for observant personnel, a locator sensor associated with each camera, a graphical user interface (GUI) module having a display, and a processor connected to the cameras and the locator sensor associated with each camera, and connected to the GUI module. Video from the cameras may be fed to the GUI. The video may be annotated by the processor with locations from locator sensors associated with the cameras. The display may provide a visualization of the location of each camera. The processor may incorporate an artificial intelligence module to process the video and locations, and based on results of processing the video and locations, can detect and model threats from the video and locations. An assessment of the threats, based on models of the threats, may result in alerts.

BRIEF DESCRIPTION OF THE DRAWING

FIG. 7 is a diagram of an integrated real time location service asset tracking and video systems;

FIG. 8 is a diagram showing an integration of a mobile phone based evacuation application with an access control data system.

DESCRIPTION

Figure 1:
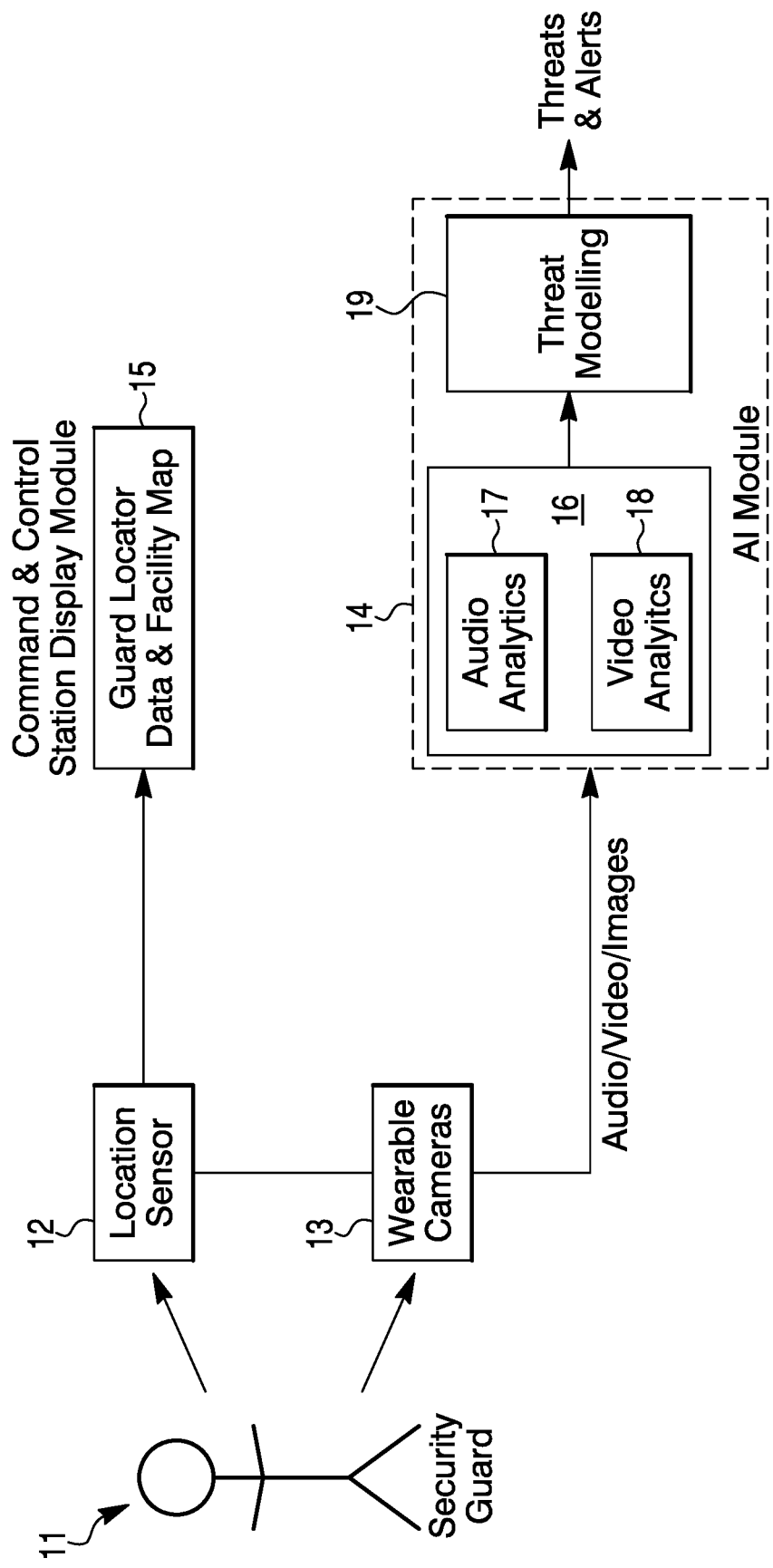
FIG. 1 is a diagram of a wearable, portable, personal or body camera having integration with a closed circuit television system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Security systems such as intrusion, access control and video/closed circuit television (CCTV) systems may be disparate systems. When the individual systems are integrated in a seamless manner, the resulting integration may drive much more valuable applications and benefit the enterprise (which would not necessarily have been possible if individual systems were to be operating as standalone systems). The present system may target how individual systems can be integrated in a seamless way to derive a number of applications at an enterprise level. The insights derived by analytics performed on data derived by integration of security systems may be a valuable differentiator. Several use cases and applications which demonstrate the value of such integrations may be noted.

The present system may have a software component. It may be a stack level of insight (analytics)—data manipulation to gain info (trend and predictive analytics tool). It may be software enabled system, having software incidental to the system. The present system may be deployed using software or manually (without the software).

There may be an IoT having a stack level, such has an insight (analytics) with data manipulation to gain information (e.g., a trend and predictive analytics tool). The system may generate or capture data. The data may originate from cameras, access control systems, intrusion systems, indoor positioning, elevators, and so on. The data may reside with-in an enterprise or cloud.

The present security system may involve an integration of access, intrusion, video systems and data. Integration of a wearable, portable, personal or body camera with a CCTV system may be noted. Security guards may be equipped with, for example, wearable cameras (body cams). The guards may also be equipped with positioning technologies such as a GPS or another positioning system, or both. As the guards may conduct periodic tours of the premises (large perimeter or critical infrastructure premises). Their location may be rendered on a suitable map of the premises as part of the visualization graphical user interface (GUI) of a system. The system may also integrate the video feeds originating from the wearable camera. The video footage may be annotated with a guard location and presented alongside with a video security feed to provide enhanced situational awareness. An artificial intelligence (AI) module may process the video feeds, detect threats and provide live alerts to the guards.

FIG. 1 is a diagram of a wearable, portable, personal or body camera having integration with a CCTV system. One or more security guards 11 may have a location sensor 12 and, for example, a wearable camera 13. An output of audio, video and images may go from wearable camera 13 to an AI module 14. An output from location sensor 12 may go to a command and control station display module 15. The output from camera 13 to module 15 may incorporate ground location data and a facility map. AI module 14 may have an analytics block 16 that incorporates audio analytics 17 and video analytics 18. Module 14 may also have a threat modeling block 19 that may receive output from analytics block 14 and provide an output of threats and alerts.

Drone detection may be used. Low cost electronic radars may be installed to detect threats from the sky over commercial buildings and critical infrastructure premises. Video cameras as well as microphones too may be installed, and data from all these sensors may be analyzed at an AI module for detection and classification of threat from drones.

There may be a detection of intrusion from rogue drones by an installation of low cost electronic radars and alert security personnel to deploy counter measures.

Detection may be of a situation where if the overhead object is a drone and a prediction, if the drone is unduly loitering, or if there is a parcel delivery drone, or just one flying past and over the premises at permitted heights. There may be a detection of a parcel delivery drone when expecting a parcel. This situation of a parcel to be delivered by drone, would not necessarily be perceived as a threat.

There may be control the pan, zoom and tilt (PTZ) cameras mounted on roof tops to take closer images of drones and perform prediction by fusion approaches. Additionally, one may perform analytics on audio feeds from microphones placed on roof tops to assist in drone detection. In sum, one may use multimodal analytics (e.g., radar, video/image and audio) in order to detect and classify a threat from drones flying over the premises.

Integration of drone based video surveillance and radar systems may be performed. Premises with a large perimeter may need a relatively larger number of fixed cameras to be installed for surveillance. An alternative approach may be to install relatively lower cost electronic radars. Analytics may be performed on radar signals. Radar output data may be used to classify objects such as humans, vehicles, animals, and so on. When humans or vehicles (plus potential intrusion activity) are detected, a drone may be autonomously navigated to the location coordinates output from radar system. Drones may be fitted with payloads for day/night surveillance including regular visible light cameras and thermal imagers. An AI module may perform analytics on the video/thermal images. For instance, an AI module may be used to detect suspicious behavior of people from video feeds in parking lots. The inferences from executing analytics on different sources (e.g., radar signals and video/thermal images from drones) may be fused to make the overall system performance more robust relative to false detections.

Figure 2A:
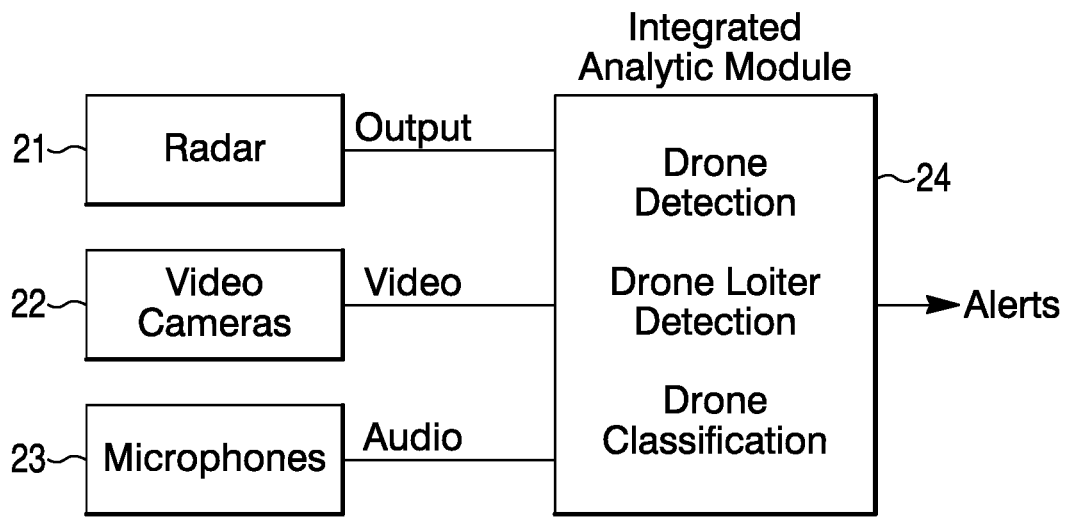
FIG. 2a may be a diagram of an intrusion detection system that may provide drone detection and classification.

FIG. 2a may be a diagram of an intrusion detection system that may provide drone detection and classification. The system may have a radar mechanism 21 with an output to an integrated analytic module 24. A video camera 22 may provide video to module 24, and a microphone 23 may provide audio to module 24. Drone detection, drone loitering detection and drone classification may occur in integrated analytic module 24. An output from module 24 may include alerts.

Figure 2B:
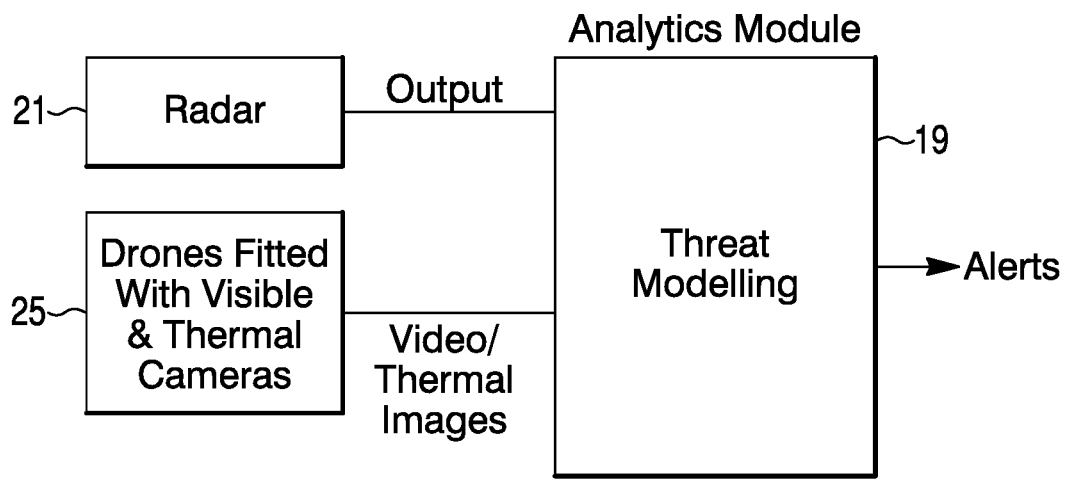
FIG. 2b is a diagram of integrated analytics with radar and drone based video feeds.

FIG. 2b is a diagram of integrated analytics with radar and drone based video feeds. An output from radar mechanism 21 may go to analytics module 19. Drones fitted with visible and thermal cameras in a block 25 may provide video and thermal images to analytics module 19 where thermal modeling occurs. An output from model 19 may provide alerts.

There may be integration of access control and indoor position apps. An assumption may be made. As mobile ID's rooted in smart phones gain acceptance for access control systems, there may an opening for another integration opportunity of indoor location information. Apps installed in smartphones of building users along with access control systems may be an enabler for several use cases and insights which would not have been possible with the traditional swipe card based access control systems. Indoor positioning capability may require certain capabilities such as BLE/WiFi support in mobile phones as well as in BLE beacons or WiFi access points installed within a set of premises. Alternative technologies for indoor positioning may be based on the earth's magnetic field finger print within buildings which would need no specific infrastructure in the buildings.

There may be locating differently abled persons in buildings to assist in case of an evacuation due to fire or other emergencies. Locations of such individuals might be rendered on smartphone apps specifically provided to emergency response team (ERT) staff and central stations. There may be monitoring visitors with indoor positioning support and issuing alerts when a visitor is left alone without an assigned escort.

Generated alerts (events) may be based on access control data (or indoor positioning data) when lone workers (for example, when working various shifts) are inside buildings. Based on the alerts, the security staff may be able to have a closer watch of concerned areas from video feeds. A set of video analytic rules may be executed to detect any suspicious behavior.

There may be analyses of anomalous data patterns from indoor locations and access control data. Alerts may be issued when individuals access non-typical locations at non-typical times.

Data from card based access control system may be processed to define and create a set of features for analytics. An card ID, swipe in and swipe out times, mean time between in and out times, number of swipes per day (mated, non-mated which would be only in but without corresponding no out) per floor (or access area). The users who use smartphone applications for access control may enable indoor position information to be reported back to a location server. The indoor location data of users may be processed to create features for further data analytics. The data features from the access control and the indoor locations may be combined (fused) together, and analyzed by machine learning (ML) algorithms (both supervised and unsupervised ML approaches), such as sequence learning, regression, classification, clustering, anomaly detection and so forth, to provide insights on security of premises.

Data gathered may be analyzed from different contexts. In one of the use cases, the data belonging to team members of a particular project team may be analyzed to gain insights and correlation with project progress metrics and productivity.

Access control and video analytics may be integrated. When a person tries to access a secure area by swiping a card or presenting other credentials, the access control system may determine, perhaps from a database in view of the person or presented credentials, an authorized level access needed by that person and then provide or deny access to the secure area of the person. Video cameras may be mounted at the entrance and within the secure areas. Video analytics performed on AI module may be used to detect a person intruding an area (by tailgating or piggy-backing an authorized person). The video analytics may be also used to detect objects carried by such intruding person (e.g., laptop), detect suspicious body language, and issue alerts.

Figure 3:
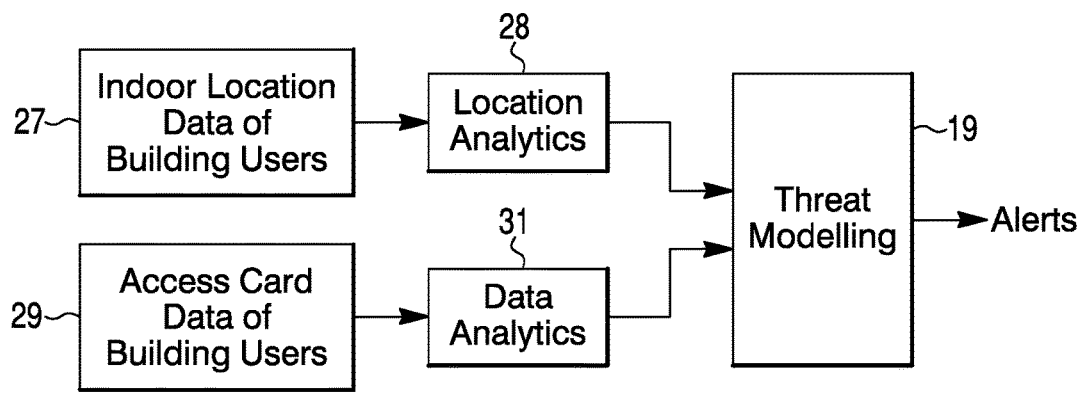
FIG. 3 is a diagram of integration of access control and indoor location data.

FIG. 3 is a diagram of integration of access control and indoor location data. The diagram shows integrated analysis of an access card and indoor location data of building users. A block 27 may provide indoor location data of building users to a location analytics block 28. An output from block 28 may go to a threat modeling module 19. Block 29 may provide access card data of building users to a data analytics block 31. An output from block 31 may go to threat modeling block 19, which in turn can provide alerts.

There may be yet another application where video analytics can be used to support access control. For instance, face recognition technology may be used as one of the accepted modalities for access control. Some of the face recognition solutions may lack capability to detect spoofing of face identity. Specifically, an impostor may use another authorized person's face images and present it to the system. The image may be displayed on a mobile phone, tablet, laptop or identity cards issued by the company. In one of the solutions, an AI module may be used to detect such spoofing attempt. The AI module may recognize and detect commonly used objects (mobile phones, tablets, laptops or identity cards) to spoof the system. The AI module may draw a bounding box to encompass the detected objects. A face detection module may be used to detect a face. If the detected face is contained (or has an overlap) with a pre-defined set of objects previously detected, then an alert may be issued if someone is trying to spoof. The AI module must be robust such that spoofing alerts are not issued when someone who is authorized because of wearing an identity badge with a matching image and legitimately presenting his or her face to an access control system.

Figure 4:
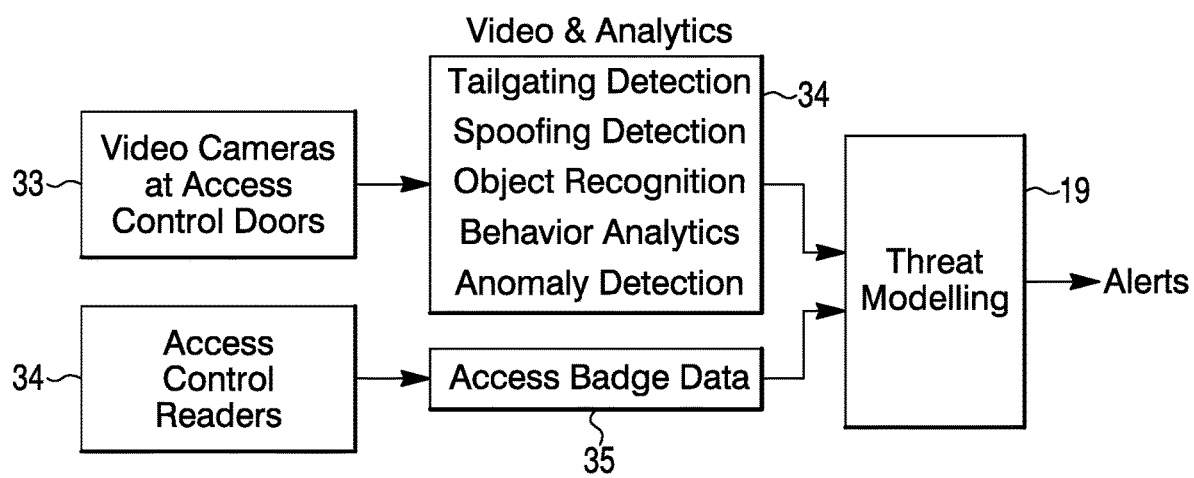
FIG. 4 is a diagram showing an integration or integrated analytics of access control with video data or analytics.

FIG. 4 is a diagram showing an integration or integrated analytics of access control with video data or analytics. Block 33 may indicate video cameras at access control doors. An output of block 33 may go to a video analytics block 34 where tailgating detection, spoofing detection, object recognition, behavior analytics, and anomaly detection are noted. A block 35 may have access control readers that provide an output to an access badge data block 35. Outputs from video analytics block 34 and access badge data block may go to analytics module 19. Module 19 may output alerts.

An integration of access control with elevator systems, parking management systems may be noted. In certain scenarios, the elevators may require access cards are used to gain access to various floors. The data streams from elevators may be used to derive insights about usage patterns. The buildings may be single or multi-tenanted in nature. There may be enhanced insights by performing data analytics on combining the access control and elevator usage. Such insights may be used to optimize the energy consumptions, user experience (optimal waiting times), and so on.

There may be further enhancements to insights when data streams from parking management systems in buildings are combined with the above data. An automatic plate number recognition (APNR) system may be installed in parking lots. The license plate data may be tagged with user data. Data, such as vehicle in and out data combined with elevator and access control data, may provide further opportunities to enhance user experience in buildings. The data analytics may also help in coming up with pricing models of a shared working space where tenants may be able to pay for parking spaces on a dynamically (pay as you use) priced model.

Figure 5:
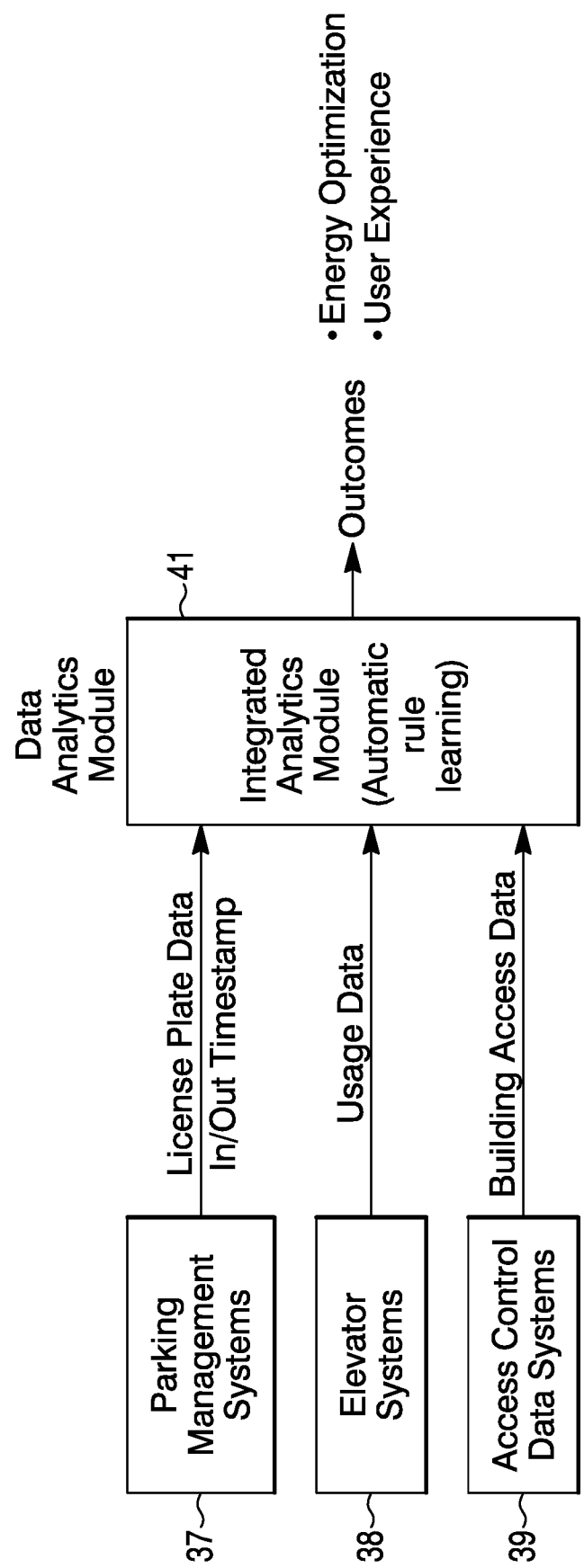
FIG. 5 is a diagram of integrated analytics on parking management systems, elevator systems and building access control data systems.

FIG. 5 is a diagram of integrated analytics on parking management systems, elevator systems and building access control data systems. A parking management system block 37 may provide license plate data and in/out times information to a data analytics module 41. Usage data from elevator systems block 38 may provide building access data to data analytics module 41.

Access control data systems block 39 may provide building access data to data analytics module 41. Module 41 may have automatic rule learning. Outcomes from module 41 may include energy optimization and user experience.

There may be logical and physical security integration. A profiling of logical (data security) risks related to individuals may be implemented by separate systems; however, exceptions detected by such a system may be integrated with physical security systems such as video systems and access control systems. When individuals who are categorized as high risk profiles from logical (data access) are present the in buildings especially when they are alone in office space as determined by access control systems, then an enhanced video surveillance may be initiated through video management systems. AI modules may be used to detect suspicious behaviors of individuals.

Figure 6:
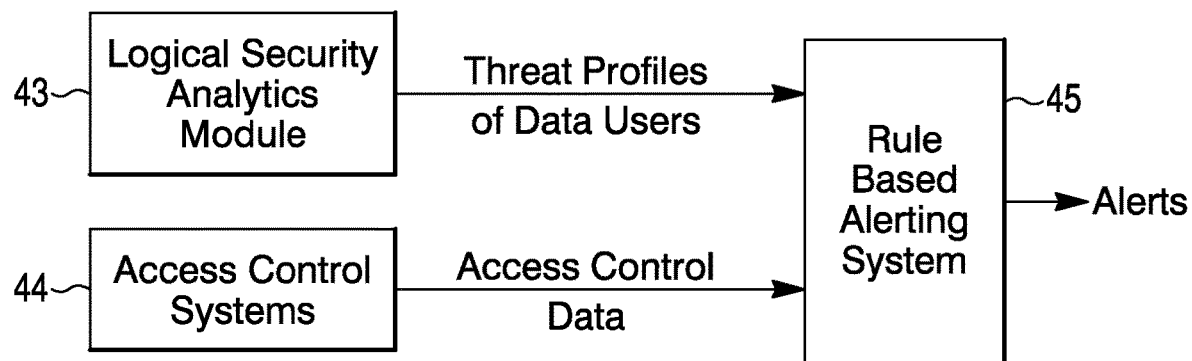
FIG. 6 is a diagram of an integrated security arrangement that combines logical and physical security systems.

FIG. 6 is a diagram of an integrated security arrangement that combines logical and physical security systems. A logical security analytics module 43 may provide threat profiles of data users to a rule based alerting system 45. An access control systems module 44 may provide assess control data to rule based alerting system 45. An output from system 45 may include alerts.

There may be asset management and video analytics integration. Hospitals and other buildings which have valuable assets (real time location service (RTLS) tagged assets) such as portable diagnostic equipment, and so forth, may need an integrated view of visibility of these assets on an integrated platform. Real time location information of assets may be rendered on a map and alerts may be issued when the assets are misplaced. Video analytics (e.g., object recognition) models may be used to recognize various assets from video feeds, and metadata related to the detected objects may be generated. Any human face information captured in proximity to the asset may be optionally recognized automatically. A correlation of the RTLS location and video information may be used for enhanced insights. A seamless integration between the RTLS location information of assets and the metadata corresponding to object recognition from video feeds may create powerful querying capabilities to trace a misplaced asset. Use of voice agents may also be used to query and retrieve a last known location of a required asset. A corresponding video feed may also be retrieved to obtain additional information on who was the person who last interacted with the asset.

FIG. 7 is a diagram of an integrated RTLS asset tracking and video systems. One or more video cameras 47 may provide an output to an asset object recognition block 48. An output of metadata may go to a metadata fusion and data analytics module 49. An RTLS server 51 may have an input of RTLS tagged assets and have an output of location, date and metadata to the metadata fusion and data analytics module 49. An output from module 49 may include asset reports, and video indexing in video recorders.

Integration of access control, fire systems and mobility may be noted. Mustering information during fire evacuation (or mock fire drills) may turn out to be a difficult task. A suitable mobile phone application installed on as a user app may automatically report a successful evacuation of an endangered individual as a rescuer and the endangered individual walk towards a safe assembly area. The mustered information may be reconciled with access control systems.

FIG. 8 is a diagram showing an integration of a mobile phone based evacuation application with an access control data system. A mobile phone evacuation application 53 may provide evacuation data to an evacuation management module 54. An access control card reader 55 may provide access control data to module 54. Data reconciliation and situational awareness may take place with evacuation management module 54. An output from module 54 may include ERT alerts to first responders.

Integration of security systems data with publicly available data sets (e.g., social media such as Twitter, Facebook, and so on) may be noted. There may be an opportunity to perform data analytics based on data sets (i.e., streams) available in the public domain such as social media data (Twitter, Facebook, traffic data, weather, neighborhood safety news, and other information sources). Insights gained by mining data streams might be used to evaluate threats to enterprises and issue appropriate alerts to security personnel.

Figure 9:
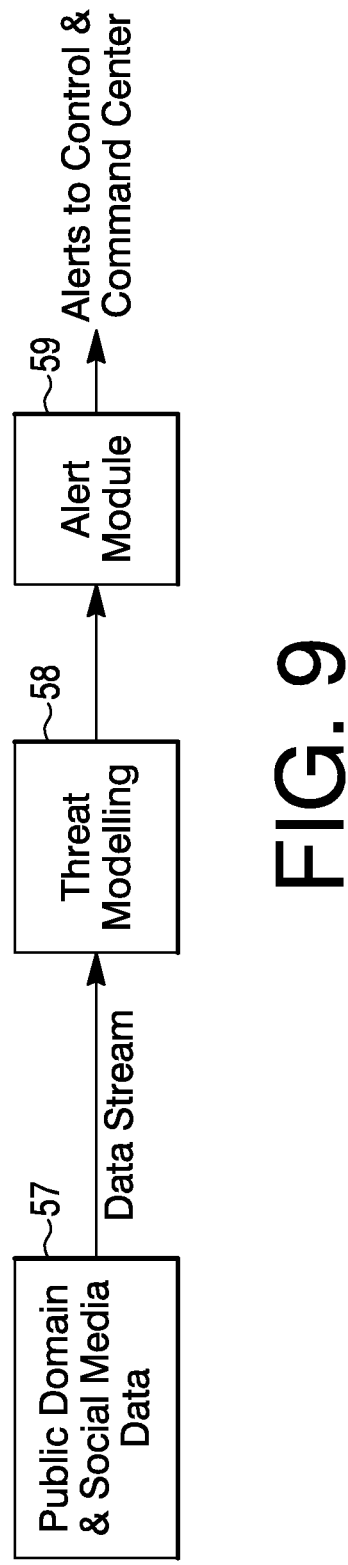
FIG. 9 is a diagram of an integration of public domain and social media data with security systems for security insights.

FIG. 9 is a diagram of an integration of public domain and social media data for security insights. Block 57 may be of public domain and social media data. An output of block 57 may be a data stream going to a threat modeling module 58. An output from module 58 may go to an alert module 59. An output from module 59 may include alerts to a control and command center.

To recap, a security system may incorporate one or more portable cameras for one or more personnel, respectively, a locator sensor associated with each portable camera of the one or more portable cameras, a graphical user interface (GUI) module having a display, and a processor connected to the one or more portable cameras and the locator sensor associated with each portable camera, and connected to the GUI module. Video from the one or more portable cameras may be fed to the GUI, and the video may be annotated by the processor with a location from each locator sensor associated with each portable camera, respectively. The display may provide a visualization of the location of each portable camera. The processor may process the video and locations, and based on results of processing the video and location, the processor can detect and model threats from the video and locations.

The processor may do an assessment of the threats based on models of the threats, and provide alerts to the one or more personnel via a phone or other media. The one or more personnel may be security personnel.

The one or more personnel may provide observations or other information via the phone or other media relevant to any received alerts.

The processor may receive observations and information from the one or more personnel, update the assessment, and update the alert as warranted by the processor.

The processor may incorporate an artificial intelligence module for processing the video, locations, observations and information from the one or more personnel.

The artificial intelligence module may incorporate a video analytics module configured to process the video information and locations, an audio analytics module for processing, in conjunction with the video analytics module, observations and information from the one or more personnel. A threat modeling module, connected to the video analytics module and the audio analytics module, may output the alerts.

A facility access security system may incorporate a video camera arrangement having a field of view that covers access controlled points of entry external to premises, and internal for facilities and spaces within the facilities, an access control system having an access control mechanism at one or more points of entry to the premises, facilities and spaces within the premises and facilities, respectfully, and an analytics module connected to a first output of the video camera arrangement and a second output of the access control system. The analytics module may receive video information from the first output of the video camera arrangement, access control information from the second output of the access control system, and generate a threat model relative to access to the premises.

The analytics module may perform one or more actions of a group having spoofing detection, tailgate detection, object recognition anomaly, and behavior analysis.

The premises may incorporate a parking space covered by the access control system at the one or more points of entry for the premises. The access control system may obtain license plate data and in and out times information for the parking space.

The premises may incorporate one or more elevator systems covered by the access control system at the one or more points of entry for the premises. The access control system may obtain usage data of the one or more elevator systems.

The access control system may obtain usage data for the points of entry to the facilities and spaces therein.

The analytics module may output energy optimization.

The analytics module may incorporate rule based alerting and automatic rule making.

An intrusion detection security arrangement may incorporate a radar system, a video camera system, a sound sensor system, and an integrated multimodal analytics module. The integrated multimodal analytics module may process input signals from the radar system, the video camera system and the sound sensor system, for developing an intrusion threat model.

The arrangement may further incorporate a drone system fitted with a video camera system and a thermal camera system configured for day and night surveillance.

The integrated multimodal analytics module may further process input signals from the video camera system and the thermal camera system fitted on the drone system, for further developing the intrusion threat model.

The intrusion threat model may be a basis for alerts of objects from the sky and toward perimeters of premises being guarded by a security arrangement.

An intrusion threat model may be a basis for rogue drone detection, loitering drone detection, friendly drone detection and classification of detected drones according to a threats to premises or to property being guarded by a security arrangement.

The objects may be people, vehicles, animals, and random objects.

The integrated multimodal analytics module can detect suspicious behavior of people on the premises being watched over by the security arrangement from inferences due to executing analytics on signals from one or more items from a group incorporating the radar system, sound sensor system, video camera system, and the video camera system and the thermal camera system fitted on the drone system.

Any publication or patent document noted directly or indirectly herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modification

What is claimed is:

1. A facility access security system comprising:
an access control system having an access control mechanism configured to receive a user's credentials at one or more points of entry to the premises, facilities and spaces within the premises and facilities, respectfully, wherein the access control system is configured to generate an access data output;
an indoor positioning system configured to a locate and identify one or more users within the premises and facilities, the indoor positioning system configured to identify a user of the one or more users and a location of said user with a mobile ID of said user's mobile device and a wireless signal emitted from the user's mobile device, and wherein the indoor positioning system is configured to generate an indoor location data output;
a location analytics module configured to receive the access control data output; and
a data analytics module configured to receive the indoor location data input;
wherein the access control data output is automatically integrated with the indoor location data input to generate a threat model relative to access to the premises.

2. The facility access security system of claim 1, wherein indoor positioning system is configured to provide a location of one or more users to an emergency responder.

3. The facility access security system of claim 1, wherein the analytics module is configured to provide an alert when a visitor to the premises is unescorted.

4. The facility access security system of claim 1, wherein:
the analytics module is configured to generate an alert when lone workers are within the premises; or
the analytics module is configured to generate an alert when a user accesses a non-typical location at a non-typical time.

5. A facility access security system comprising:
an access control system having an access control mechanism configured to receive a user's credentials at one or more points of entry to the premises, facilities and spaces within the premises and facilities, respectfully;
a data security analytics module; and
an alerting system connected to a first output of the access control system and a second output of the data security analytics module; and
wherein the alerting system receives and integrates access control information from the first output of the access control system and a threat profile of a data user from the second output of data security analytics module and generates a rule based alert, the threat profile of the data user indicative of a risk to data security.

6. The facility access security system of claim 5, wherein the alerting system is configured to alert when a data user who is categorized as a high risk is present in the premises, an enhanced video surveillance is initiated through a video management system.

7. The facility access security system of claim 5, wherein the alerting system is configured to detect suspicious behaviors of an individual.

8. An asset management system comprising:
one or more assets each including a real time location service (RTLS) tag;
a RTLS server in communication with the one or more RTLS tags;
one or more video cameras configured to provide an output to an asset recognition module; and
a data analytics and metadata fusion module connected to a first output of the RTLS server and a second output of the asset recognition module; and
wherein the data analytics and metadata fusion module receives and integrates asset location information and metadata from the first output of the RTLS server and metadata from the asset recognition module and generates a report; and
wherein the asset recognition module is configured to process a video feed of the one or more video cameras with video analytics to recognize at least one asset of the one or more assets from the video feed of the one or more video cameras.

9. The asset management system of claim 8, wherein the report includes a location of the one or more assets, a date, and video indexing.

10. The asset management system of claim 8, wherein the data analytics module is configured to render real time location information of the one or more assets on a facility map.

11. The asset management system of claim 8, wherein the data analytics module is configured to issue an alert when one of the one or more assets is misplaced.

12. The asset management system of claim 8, wherein the data analytics module is configured to recognize a human face captured in proximity to at least one asset of the one or more assets.

13. The asset management system of claim 8, wherein the data analytics module is configured to receive a query.

14. The asset management system of claim 13, wherein the query includes tracing a misplaced asset.

15. The asset management system of claim 13, wherein the query requests a last known location of the misplaced asset.

16. The asset management system of claim 13, wherein the query requests an identity of a person who last interacted with misplaced asset.

* * * * *